(12) United States Patent
Meid et al.

(10) Patent No.: US 8,479,896 B2
(45) Date of Patent: Jul. 9, 2013

(54) HYDRODYNAMIC RETARDER

(75) Inventors: Thomas Meid, Deggenhausertal (DE);
Dirk Huhn, Friedrichshafen (DE);
Michael Ptock,
Schonungen-Waldsachsen (DE);
Michael Huber, Langenargen (DE);
Christian Selinka, Poppenhausen (DE);
Reinhold Mayer, Ravensburg (DE)

(73) Assignee: ZF Friedrichshafen AG,
Friedrichshafen (DE)

( * ) Notice: Subject to any disclaimer, the term of this patent is extended or adjusted under 35 U.S.C. 154(b) by 842 days.

(21) Appl. No.: 12/602,608

(22) PCT Filed: May 19, 2008

(86) PCT No.: PCT/EP2008/056090
§ 371 (c)(1),
(2), (4) Date: Dec. 1, 2009

(87) PCT Pub. No.: WO2008/145549
PCT Pub. Date: Dec. 4, 2008

(65) Prior Publication Data
US 2010/0175958 A1    Jul. 15, 2010

(30) Foreign Application Priority Data
Jun. 1, 2007   (DE) .................. 10 2007 025 675

(51) Int. Cl.
*F16D 57/04*    (2006.01)
(52) U.S. Cl.
USPC ............................................ 188/296; 60/366

(58) Field of Classification Search
USPC ................... 188/290, 293, 296; 60/338, 364, 60/365, 366; 416/223 R
See application file for complete search history.

(56) References Cited

U.S. PATENT DOCUMENTS

| | | | | |
|---|---|---|---|---|
| 2,487,250 A | | 11/1949 | La Brie | |
| 2,807,217 A | * | 9/1957 | Krzyszczuk | 60/364 |
| 3,166,161 A | * | 1/1965 | Hayes | 188/296 |
| 3,537,264 A | * | 11/1970 | Nagel | 188/296 |
| 4,982,819 A | * | 1/1991 | Koshimo | 188/296 |
| 2003/0188940 A1 | | 10/2003 | Jonsson et al. | |
| 2010/0175958 A1 | * | 7/2010 | Meid et al. | 188/290 |
| 2010/0193307 A1 | * | 8/2010 | Meid et al. | 188/296 |

FOREIGN PATENT DOCUMENTS

| | | |
|---|---|---|
| DE | 12 44 494 | 7/1967 |
| DE | 14 75 509 | 3/1971 |
| DE | 696 08 592 | 9/2000 |

(Continued)

*Primary Examiner* — Thomas J Williams
(74) *Attorney, Agent, or Firm* — Cozen O'Connor

(57) ABSTRACT

A hydrodynamic retarder having a first blade wheel and a second blade wheel concentric thereto, forming a hydrodynamic circuit grouped about a common rotary axis. Each blade wheel includes a base body and a blade arrangement fixed thereto including a plurality of blades each connected to receptacles in the base body. A first ring segment of at least one blade wheel includes at least one first blade having a flow edge facing the other blade wheel in each case, said edge having at least one extension running in a substantially straight line between the radial outer end thereof and the radial inner end thereof, and at least one second blade is provided in a second ring segment of the blade wheel, the blade having a retraction both opposite the flow edge facing the other blade wheel in each case, and opposite a protrusion protruding in the direction of the other blade wheel.

6 Claims, 2 Drawing Sheets

FOREIGN PATENT DOCUMENTS

| | | |
|---|---|---|
| DE | 103 43 425 | 4/2005 |
| DE | 10 2004 003 949 | 8/2005 |
| DE | 601 18 749 | 11/2006 |
| DE | 12 70 898 | 6/2008 |
| DE | 10 2007 025 675 | 12/2008 |
| EP | 1 380 766 | 1/2004 |
| EP | 1 305 535 | 4/2006 |
| WO | WO 02/04834 | 1/2002 |
| WO | WO 2008/145549 | 12/2008 |

\* cited by examiner

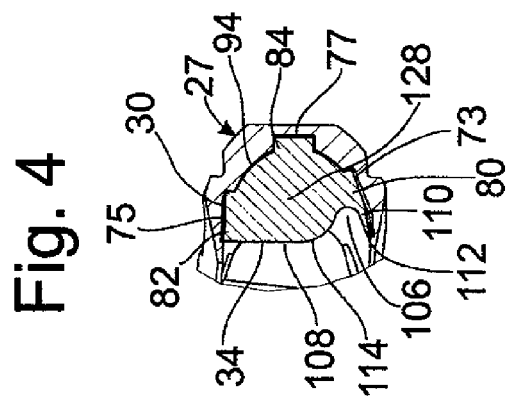
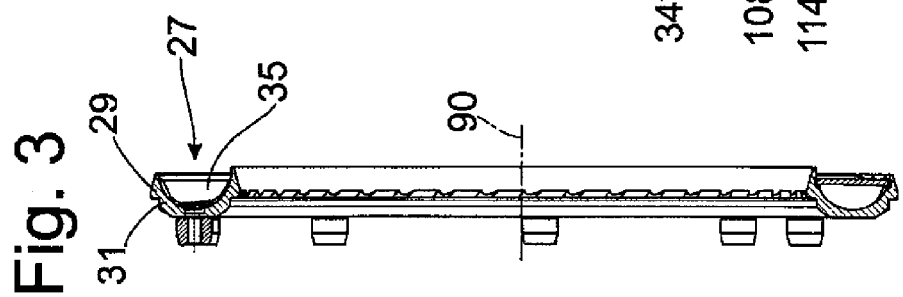
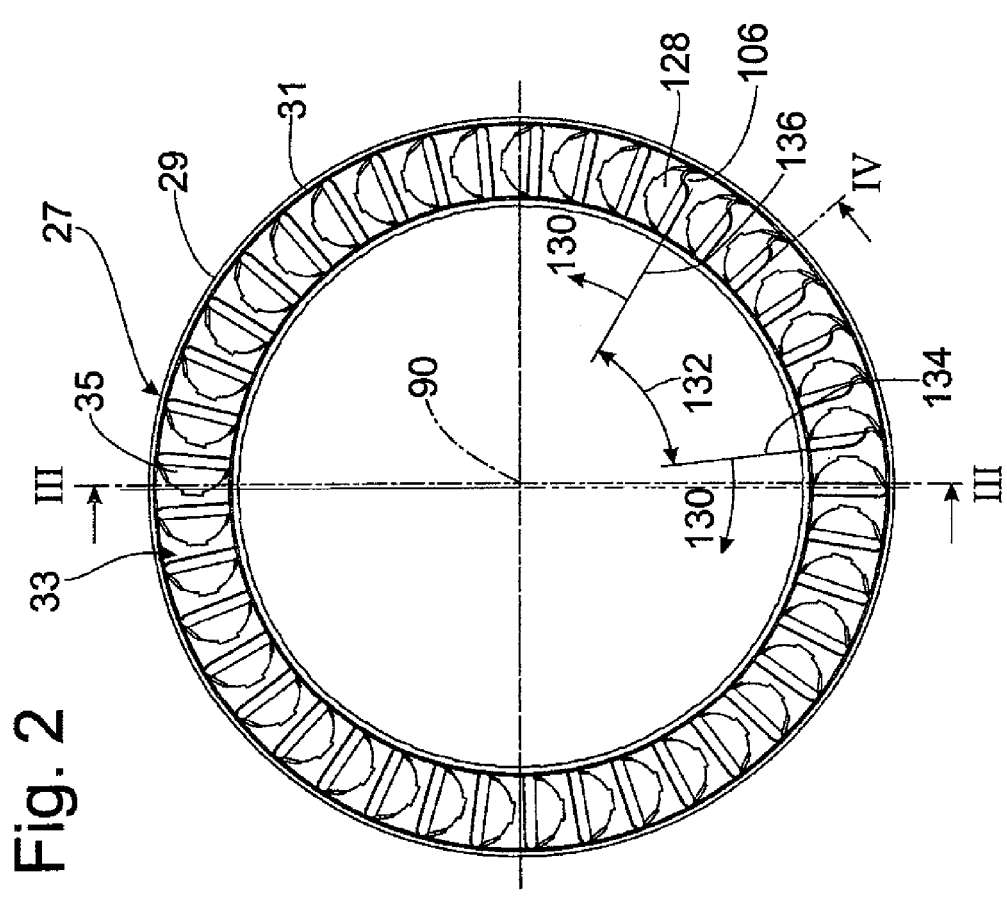

US 8,479,896 B2

HYDRODYNAMIC RETARDER

PRIORITY CLAIM

This is a U.S. national stage of application No. PCT/EP2008/056090, filed on May 19, 2008 which claims Priority to the German Application No.: 10 2007 025 675.4, filed: Jun. 1, 2007; the contents of both being incorporated herein by reference.

BACKGROUND OF THE INVENTION

1. Field of the Invention

The invention pertains to a hydrodynamic retarder with a first blade wheel, acting as a rotor blade wheel, and with a second blade wheel, concentric to the first, acting as a stator blade wheel, which together form a hydrodynamic circuit and are grouped around a common axis of rotation.

2. Prior Art

A hydrodynamic retarder with a first blade wheel, acting as a rotor blade wheel, and with a second blade wheel, concentric to the first, acting as a stator blade wheel, is known from EP 1 305 535 B1. These two blade wheels form a hydrodynamic circuit and are grouped around a common axis of rotation, wherein each blade wheel consists of a base body and a blading with a plurality of blades permanently attached to the base body, each blade being connected to receptacles in the base body by blade tangs.

Retarders of this type suffer from the basic problem that cavitation occurs as a result of the high-speed infeed of fresh fluid into the hydrodynamic circuit. This can cause damage to the blading of the stator blade wheel, usually in a radially outer area of the blades. For this reason, all of the blades on the stator blade wheel have a bevel in the radially outer area, extending back from the flow edge, i.e., the edge which faces the rotor blade wheel. In the case of a blade design of this type, however, only the radially outermost end of the blade is protected from cavitation, not the part of the blade most affected by it, namely, the area radially inside this radially outermost end. Blades machined in this way are not only more expensive than conventional blades but are also seated less reliably in the base body of the blade wheel in the radially outer area because of the reduced length by which they can be fitted into the base body. These blades, furthermore, are used around the entire circumference of the stator blade wheel, even though the problem of cavitation is limited primarily to the area where fresh fluid enters the hydrodynamic circuit or to the area closely adjacent to this entry area.

SUMMARY OF THE INVENTION

According to one embodiment of the invention blading of a blade wheel, especially of a stator blade wheel, in a hydrodynamic retarder is designed such that, even though the blading can be produced at minimal cost and seated with high reliability within the base body of the blade wheel, there is minimal risk of the action of cavitation.

By making at least one of the blade wheels, especially the stator blade wheel, in the form of two ring segments, the use of the blades designed with a setback to avoid cavitation can be limited to the ring segment where the fluid enters to supply the hydrodynamic circuit with fresh fluid, i.e., the segment where there is the risk of cavitation acting on the blades. This ring segment will therefore preferably extend between an outlet area of the corresponding blade wheel assigned to the fluid intake and a control area of the blade wheel. A different ring segment is assigned to the remaining part of the circumference of this blade wheel. Based on the requirements which must be fulfilled here, this ring segment comprises blades with a flow edge that extends substantially in a straight line between the radially inner end and the radially outer end of the blade, the blade therefore being of conventional design. The ring segment with these conventional blades will be referred to in brief as the "first" ring segment, and the conventional blades will be referred to as the "first" blades, whereas the blades designed with a setback will be referred to as the "second" blades and the ring segment holding them as the "second" ring segment.

Due to the inventive measure, the blading of this blade wheel is designed so that the second blades, which are insensitive to cavitation, are used exclusively in the areas of the blade wheel in question which are subject to the danger of cavitation, whereas, in the remaining area of the blade wheel, in which cavitation is hardly a factor, less-expensive "first" blades, i.e., blades of the conventional type, are used, which, because of their larger load-bearing surface, especially in the radially outer area, are easy to mount.

Because of the placement of the setback radially between the blade edge and a radially outer projection, which promotes the reliable stable mounting of the blades in the base body of the blade wheel because of the concrete geometric design of the setback with an essentially arc-like course; and because of the continuous design of the transitions between the setback and the blade edge on one side and between the setback and the projection on the other side, the second blades are optimally adapted to handling the loads caused by cavitation, because points where cavitation could attack are almost completely eliminated.

BRIEF DESCRIPTION OF DRAWINGS

The invention is explained in greater detail below on the basis of an exemplary embodiment:

FIG. 2 is a top view of the stator blade wheel, in isolation, looking in the direction indicated by line II-II in FIG. 1;

FIG. 3 is a cross section through the stator blade wheel along line III-III in FIG. 2; and FIG. 4 is a cross section through the stator blade wheel along line IV-IV in FIG. 2.

DETAILED DESCRIPTION OF DRAWINGS

Figure 1:
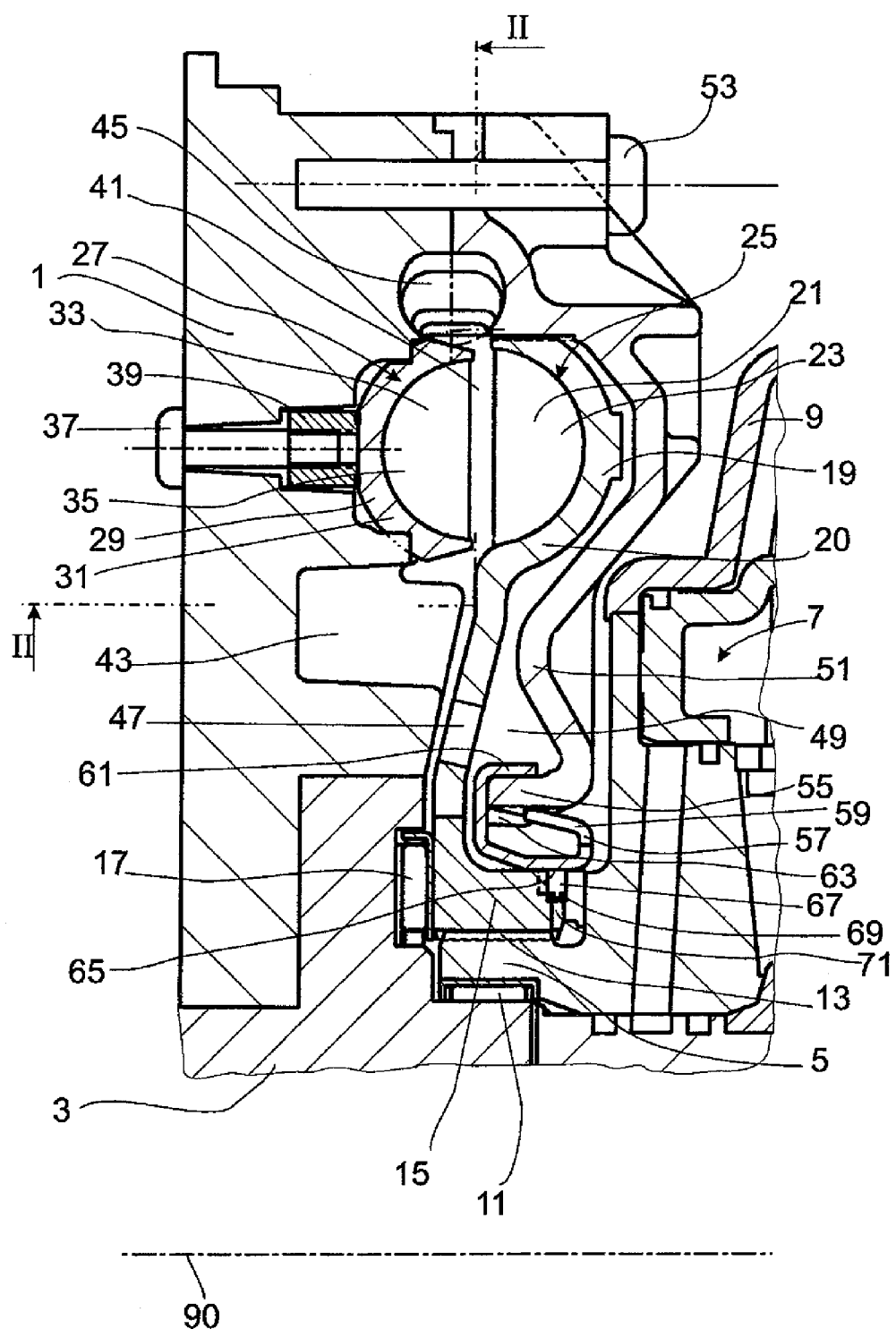
FIG. 1 is the upper half of a longitudinal cross section through a hydrodynamic retarder with a rotor blade wheel and a stator blade wheel.

FIG. 1 is a hydrodynamic retarder. A retarder carrier 1, attached nonrotatably to a transmission housing (not shown) is provided. The carrier, radially encloses a support element 3, which is also nonrotatable. Via a radial bearing 11, the support element 3 is also encircled by a clutch hub 5 of a clutch unit 7, which has a clutch housing 9 that is connected nonrotatably to a transmission input shaft (not shown). As a result of this connection, the clutch unit 7 and thus the clutch housing 9 participates in the rotational movement of the transmission input shaft.

To return to the clutch hub 5 of the clutch unit 7: the clutch hub 5 engages by a set of teeth 13 with a rotor hub 15 of the retarder. The rotor hub 15 is supported axially on the side facing away from the clutch unit 7 by an axial bearing 17 at the support element 3. The rotor hub 15 is attached to a base body 19 serving as a rotor shell 20, which base body, proceeding from the rotor hub 15, extends radially outward and holds, in the radially outer area, a blading 21 with a plurality of blades 23, thus forming a first blade wheel in the form of a rotor blade wheel 25. The rotor blade wheel 25 cooperates with a second blade wheel in the form of a stator blade wheel 27 of the retarder, which also has a base body 29, which acts as a stator shell 31 and serves to hold a blading 33 with first blades 35 and second blades 128 (FIGS. 2, 3). On the side of the stator shell 31 facing away from the rotor blade wheel 25, threaded sleeves 39, distributed around the circumference, are provided, into each of which a fastening element 37 can be introduced, wherein the stator blade wheel 27 is attached to the retarder carrier 1 by the fastening elements 37 in cooperation with the threaded sleeves 39.

The rotor blade wheel 25 cooperates with the stator blade wheel 27 to form a hydrodynamic circuit 41, which is at least partially filled with viscous medium. The degree to which the hydrodynamic circuit 41 is filled can be increased through a fluid intake 43, The viscous medium can be discharged from the hydrodynamic circuit 41 through a fluid outlet 45. In the known manner, the degree to which the hydrodynamic circuit 41 can transmit torque and thus the intensity of the braking action produced by the retarder can be adjusted by the degree to which the hydrodynamic circuit 41 is filled. The fluid intake 43 thus serves in cooperation with the fluid outlet 45 to regulate the retarder.

To return to the base body 19 of the rotor blade wheel 25: a pressure equalizer 47 in the form of at least one throughbore is formed in rotor shell 20. By this pressure equalizer 47, the hydrodynamic circuit 41 is connected to a compensating space 49, which is located axially between the base body 19 of the rotor blade wheel 25 and a sealing flange 51, which is attached by fastening elements 53 to the retarder carrier 1. Before the structural design of this sealing flange 51 is discussed, the function of the compensating space 49 is to be explained briefly. Because the pressure equalizer 47 has pressure conditions similar to those of the hydrodynamic circuit 41, the base body 19 of the rotor blade wheel 25 is prevented from being subjected to severe loads on the side facing the hydrodynamic circuit 41.

In the radially inner area, the sealing flange 51 comprises an axially oriented mounting projection 55 pointing essentially in the direction toward the rotor blade wheel 25. An annular spring seal 57 is provided on this projection 55. A first side piece 59 of this seal grips behind a radial lobe 63 provided on the mounting projection 55, and a second side piece 61 grips behind the radially opposing side of the mounting projection 55. Thus mounted both axially and radially on the sealing flange 51, the annular spring seal 57 exerts pressure by way of its bottom surface 65 on the clutch hub 5. To guarantee a satisfactory seal at this contact point between the stationary sealing flange 51 and the rotating clutch unit 7, a sealing ring 67 is inserted into a groove 69 in the clutch hub 5; this sealing ring and preferably also the groove 69 are rectangular in cross section. The sealing ring 67 consists preferably of gray cast iron, but alternatively it can be produced out of an elastomeric material. A lubricating bore 71, which is formed in the clutch hub 5 and extends essentially in the radial direction, is assigned to the sealing ring.

As can be seen in FIG. 1, the retarder is centered on an axis 90. This axis can also be seen in FIGS. 2 and 3. FIG. 2 serves to illustrate the blading 33 in the base body 29 of the stator blade wheel 27. FIG. 2 also shows two ring segments 130, 132, wherein the first ring segment 130 extends over the larger portion of the circumference of the base body 29 and comprises first blades 35, whereas the second ring segment 132 extends over the remaining portion of the circumference of the base body 29 and comprises second blades 128. The second ring segment 132 extends between an outlet area 134 assigned to the fluid intake 43 and a control area 136, following after the outlet area in the flow direction. The first blades 35 of the blading 33 are designed in the conventional manner and thus do not need to be discussed further, the second blades 128 are designed in the inventive manner to be described below. With respect to the shape of the first blades 35 and their attachment to the base body 29 of the stator blade wheel 27, reference is made herewith to DE 103 43 425 A1 incorporated herein by reference, which means that these relationships do not have be described here.

FIG. 4 is a portion of the circumference of the second ring segment 132 with a second blade 128 of the stator blade wheel 27. As is also true for the mounting of the first blades 35 of the blading 33, the base body 29 for the mounting of the second blades 128 also comprises a plurality of receptacles 73, 75, 77. Of these, an outer receptacle 73 and a radially inner receptacle 75 extend into an inner base body wall 30 with a dominant component in the radial direction, for which reason these two receptacles 73, 75 can be referred to as "radial receptacles". The radial receptacle 73 starts from the inner base body wall 30 and extends radially outward from there, whereas the radial receptacle 75 extends radially inward. Essentially centered radially in the blade space 34 in the base body 29, another receptacle 77 is provided, which starts from the inner base body wall 30 and proceeds with a primary component in the axial direction, for which reason this receptacle 77 can be referred to as the "axial receptacle".

As can also be seen in FIG. 4, the second blades 128 each have blade tangs 80, 82, which start from the blade edge 94 facing the base body and extend with a primary component in the radial direction, and which therefore can be referred to as "radial blade tangs". Another blade tang 84 is also provided approximately in the center of the radial dimension of the blade. This tang starts from the blade edge 94 facing the base body and proceeds with a primary axial component; it can therefore be referred to as the "axial blade tang" 84.

The axial side of the second blade 128 opposite the axial blade tang 84 serves as a flow edge 108. At its radially outer edge 114, this flow edge 108 merges in a substantially continuous manner with a preferably arc-shaped setback 106, which, radially farther out, merges, again in an essentially continuous manner, with a projection 110, which is located in the radial area of the radial blade tang 80 and which, starting from this point, proceeds by its free end 112 toward the rotor blade wheel 25. The projection 110 approaches the other blade wheel 25 in question at least essentially as far as the flow edge 108 does. The projection 110 stabilizes the second blade 128 inside the base body 29 of the stator blade wheel 27.

The setback 106 in the second blade 128 is placed such that the area of the blade 128 where cavitation-caused damage could occur is carved away to such an extent that the action of cavitation is at least reduced or even completely eliminated. Because cavitation-caused damage occurs at least essentially only within the second ring segment 132, i.e., between the outlet area 134 assigned to the fluid intake and the control area 126 on the stator blade wheel 27, it is sufficient to use the second blades 128 with the inventive geometric modification of the flow edge 108 only within this ring segment 132, whereas the first ring segment 130 can be provided preferably exclusively with the conventionally designed first blades 35.

A plurality of second blades 128 is preferably provided in the second ring segment 132, even more preferably between 5 and 10 blades 128. It is especially advantageous to use 7 of these types of blades 128 in the second ring segment 132.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A hydrodynamic retarder comprising:
   a rotor blade wheel comprising:
   a first base body defining a plurality of receptacles;
   a first plurality of blades;
   first blade tangs connecting at least some of the first plurality of blades to respective receptacles in the first base body; and
   a stator blade wheel comprising:
   a second base body defining a plurality of receptacles;
   a second plurality of stator blades, concentric to the rotor blade wheel, the first blade wheel and the second blade wheel grouped around a common axis of rotation to form a hydrodynamic circuit;
   second blade tangs connecting at least some of the second plurality of blades to respective receptacles in the base body;
   wherein one of the rotor blade wheel and the stator blade wheel further comprises:
      a first ring segment comprising at least one first blade having a flow edge facing the other blade wheel, the flow edge having a radially outer end and a radially inner end, the flow edge extending in a substantially straight line between the radially outer end and the radially inner end; and
      a second ring segment comprising at least one second blade, the at least one second blade comprising a setback from:
         a flow edge facing the other blade wheel and
         a projection projecting toward the rotor blade wheel;
      wherein the setback between the radially outer end of the flow edge and the projection is curved and essentially arc-shaped, the setback merging in an at least essentially continuous manner with at least one of the flow edge and the projection, and
      the second ring segment extends between an outlet area assigned to the fluid supply and a control area of the rotor or stator blade wheel.

2. The hydrodynamic retarder according to claim 1, wherein:
   the first setback is provided between a radially outer end of the flow edge and the projection, and
   the projection is located in a radially-extending area of a radially outer blade tang of the second blade.

3. The hydrodynamic retarder according to claim 1, wherein a free end of the projection of the second blade approaches the other blade wheel at substantially a same degree as the flow edge of the second blade.

4. The hydrodynamic retarder according to claim 1, wherein the stator blade wheel is configured to hold the at least one second blade provided with the setback.

5. The hydrodynamic retarder according to claim 1, wherein the second ring segment of the corresponding blade wheel is configured to hold a plurality of second blades, wherein each of the plurality of second blades is provided with a setback.

6. The hydrodynamic retarder according to claim 3, wherein the stator blade wheel is configured to hold the at least one second blade provided with the setback.

\* \* \* \* \*